(12) United States Patent
Drucker et al.

(10) Patent No.: US 7,890,356 B1
(45) Date of Patent: Feb. 15, 2011

(54) REASONABLE VALUE SELF INSURED MEDICAL BENEFIT PLAN

(75) Inventors: Vincent Drucker, Dallas, TX (US);
Scott Brock, Dallas, TX (US)

(73) Assignee: Fairpay Solutions, Inc., Addison, TX (US)

( * ) Notice: Subject to any disclaimer, the term of this patent is extended or adjusted under 35 U.S.C. 154(b) by 337 days.

(21) Appl. No.: 11/841,507

(22) Filed: Aug. 20, 2007

(51) Int. Cl.
*G06Q 40/00* (2006.01)

(52) U.S. Cl. .................... 705/4; 705/2; 705/3; 705/35; 705/400; 600/300

(58) Field of Classification Search ..................... 705/2, 705/3, 4, 35, 400
See application file for complete search history.

(56) References Cited

U.S. PATENT DOCUMENTS

| | | | |
|---|---|---|---|
| 6,324,516 B1 * | 11/2001 | Shults et al. | 705/2 |
| 2007/0050220 A1 * | 3/2007 | Burghardt et al. | 705/4 |
| 2007/0067247 A1 * | 3/2007 | Brookhart | 705/400 |

OTHER PUBLICATIONS

Spiegel, Ellen Barre; Spiegel, Bill; Weighing the value of cost containment in a worker comp plan, Jan. 2007, American Agen & Broker; v79n1; pp. 34-39.*

* cited by examiner

*Primary Examiner*—Behrang Badii
(74) *Attorney, Agent, or Firm*—Howison & Arnott, L.L.P.

(57) ABSTRACT

A self-insured or self funded medical benefit plan is provided by an employer wherein the self-insured medical benefit plan is governed by ERISA, and wherein the employer who is providing the medical benefit plan is 100 percent responsible for payment for medical services provided to an employee, receiving the benefit of the medical benefit plan, to a medical service provider for covered medical services and products. The medical benefit plan and method for providing the medical benefit plan determines a reasonable value for the medical services provided by a medical service provider to a participant of the plan, reprices a bill or claim from the medical service provider, and protects the participant/employee under ERISA from attempted collections of additional moneys that a medical service provider may believe is owed for the medical services but were not paid by the exemplary self insured medical benefit plan.

2 Claims, 5 Drawing Sheets

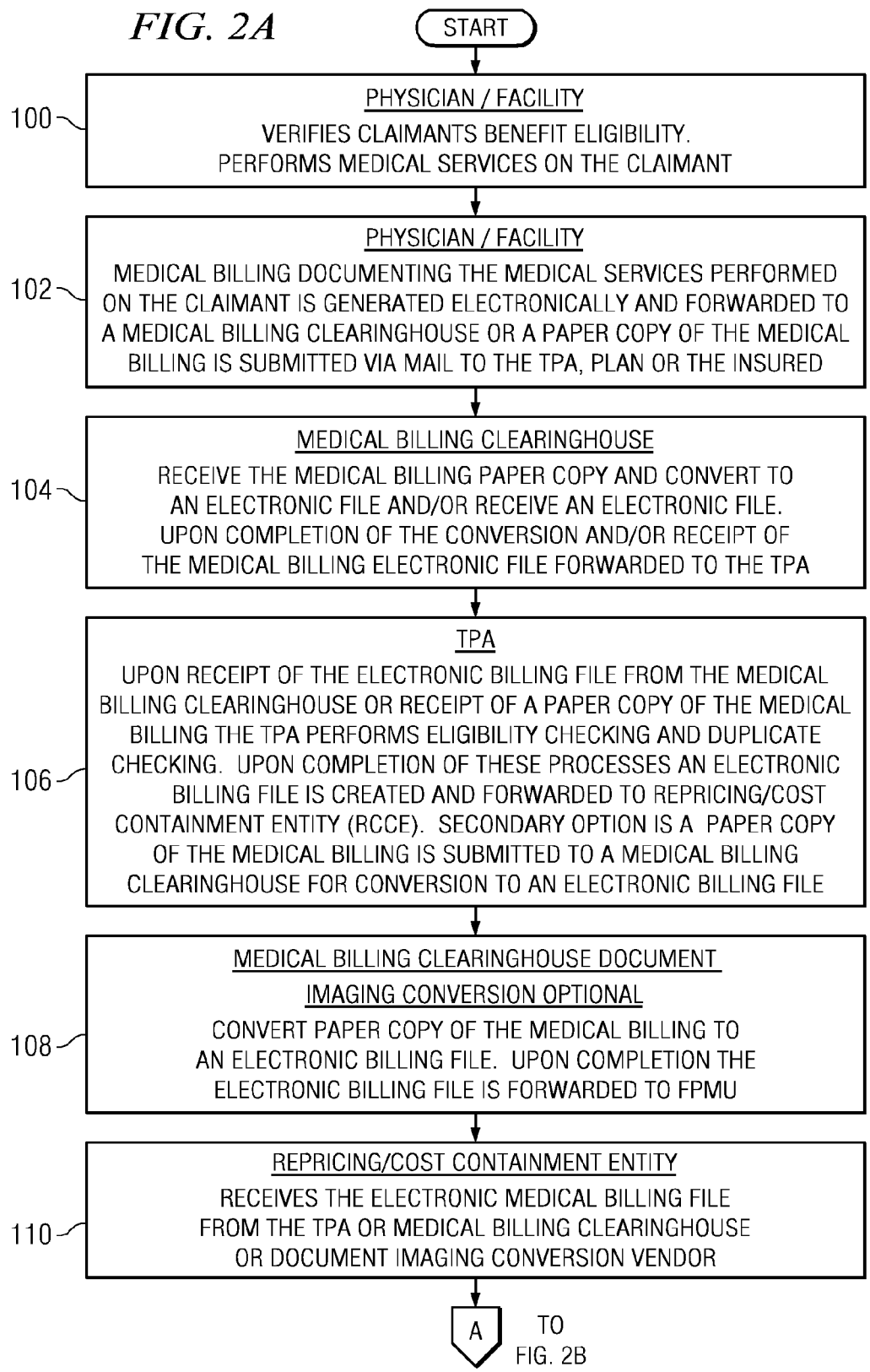

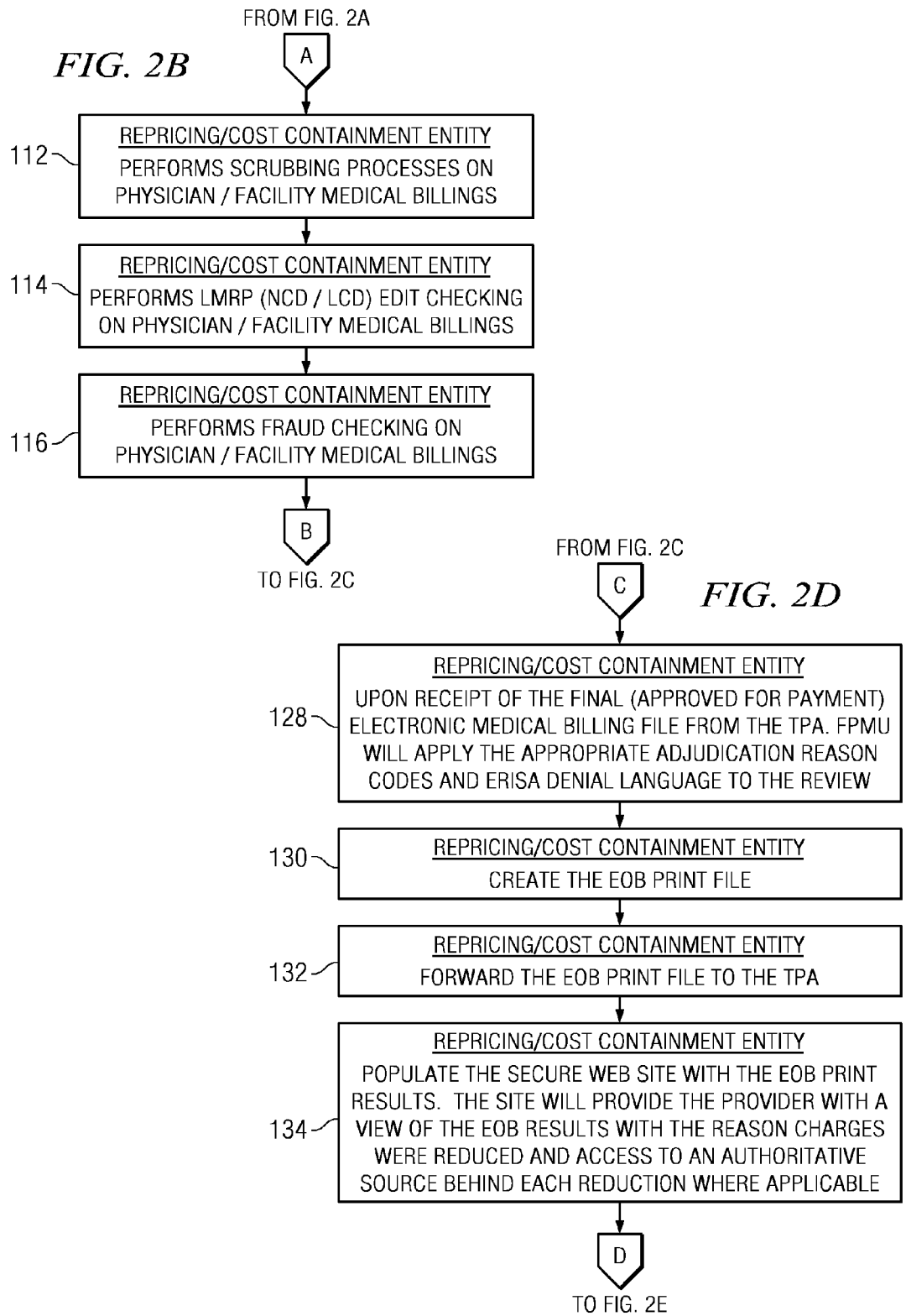

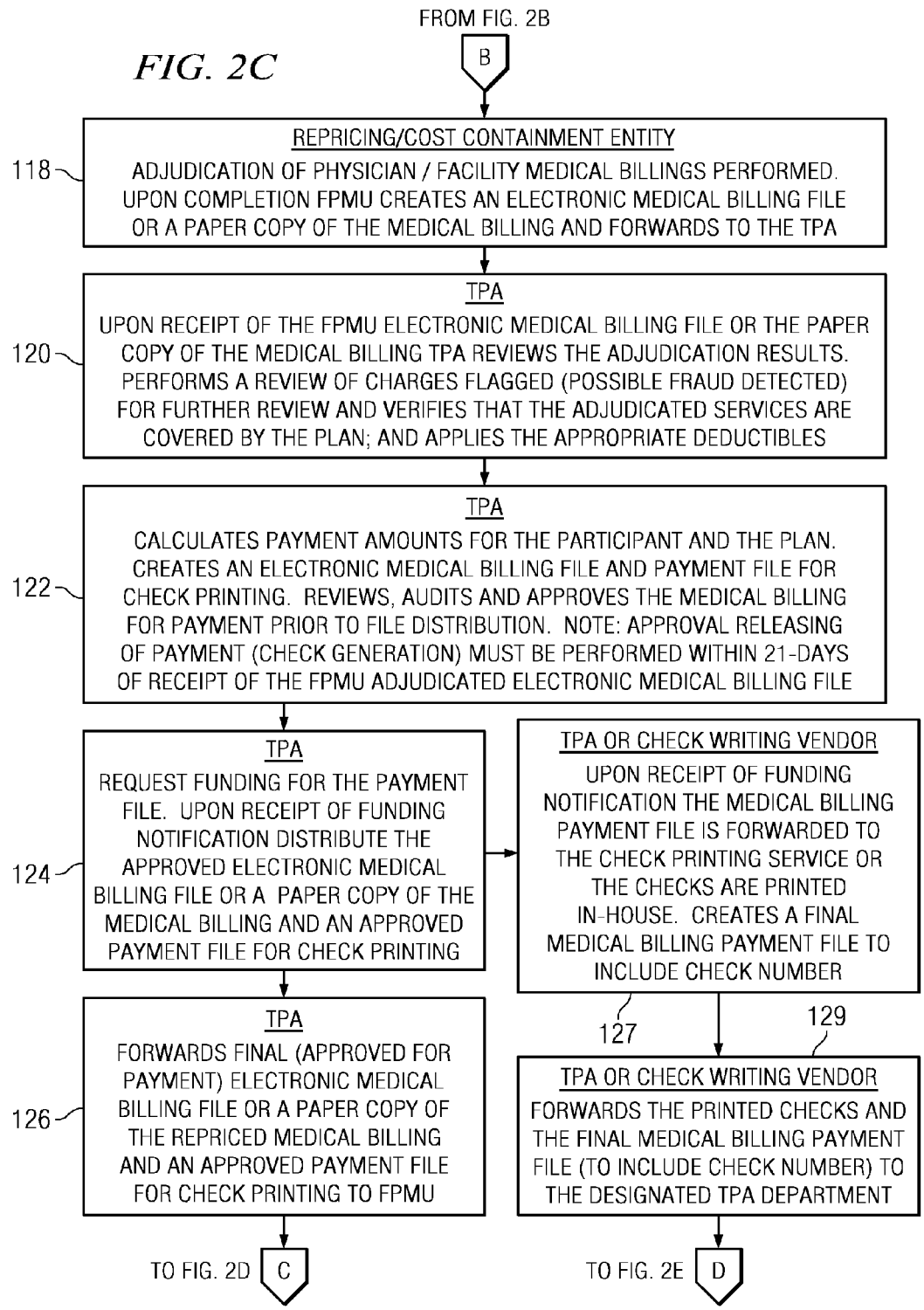

REASONABLE VALUE SELF INSURED MEDICAL BENEFIT PLAN

TECHNICAL FIELD

Embodiments of the present invention are related to medical benefit plans provided by an employer for the benefit of the employees and their immediate families. More particularly, embodiments of the present invention are related to self insured medical benefit plans, including but not limited to those that fall under the Employee Retirement Income Security Act, the administration of such plans, methods of use or operation; and various benefits provided to participants thereof.

BACKGROUND

The Employee Retirement Income Security Act of 1974 ("ERISA") governs various types of employee welfare benefit plans. One purpose of the act was to create an incentive for employers to offer health care benefits to their employees. Another purpose of the enactment of ERISA was to create an exclusive federal enclave for the regulation of employer sponsored benefit plans. The ERISA statute itself provides a business tax deduction benefit for the employer for the amount of money that is contributed toward an employer sponsored medical benefit or health care plan. The statute further provides and creates a comprehensive federal plan and format for avoiding multiple jurisdictional disputes over benefits which employees are entitled to under these health care plans and to employer's obligations under the health care plans.

An ERISA based plan for a self funded or a self insured employer is generally carried out in the following manner. A Third Party Administrator (TPA) is generally hired by an employer to help create an employer sponsored medical benefit plan. A employer sponsored medical benefit plan is any kind of funded program that is established or maintained by an employer for the purpose of providing, through the purchase of insurance or otherwise, benefits that cover medical charges, surgical charges, hospital care, and professional doctor visits. The ERISA based medical benefit plans discussed herein are directed to self insured or self funded medical benefit plans, which means that the employer has not opted for an insured plan provided by a health care insurance company (i.e. Aetna, Blue Cross-Blue Shield, United Health, etc). Furthermore, in reality, the meaning of a self-insured or self-funded medical benefit plan is that the employer is the risk bearing entity that pays a certain predetermined and defined portion of their employee's healthcare claims from the general assets of the company. This risk-bearing may be limited by the self-insured or self-funded plan purchasing stop-loss insurance and/or re-insurance for excessive payments.

A self insured employer, although ultimately responsible for payment, may protect itself from catastrophic monetary losses by hiring a stop-loss carrier or a re-insurer that issues an indemnity insurance policy to the employer that indemnifies the employer against claims over a predetermined monetary threshold point such as, for example, $30,000 per employee or payout of $1,000,000 per year for the entire group covered by the self-insured employer. Thus, the self insured employer assumes the risk of funding the first $30,000 of claims for each of its employees for a given year or time period. The employer is taking the risk, so to speak, that very few of its employees will require more than $30,000 worth of medical benefits and is limiting its risk by having any payout for an individual that exceeds $30,000 be covered by the stop-loss or a re-insurance carrier. Furthermore, the employer is hoping, in this example, that the total medical claims of the employees of the company will not exceed $1,000,000. Of course, if the total medical claims exceed the $1,000,000 number then the stop-loss or re-insurance carrier will cover the excess of any payouts after the first $1,000,000 has been paid by the employer.

Since ERISA was enacted in 1974, there have been various methods and medical benefit plan types for a self insured employer to use to pay for employee health care benefits and to contain the ever increasing costs and expenses associated with health care services. The various previous medical benefit plans have allowed an employer to continue to afford and offer health care benefits to their employees, but the affordability is now becoming questionable.

In the 1980s health maintenance organizations (HMO) were used in an attempt to contain the costs of health care, but these organizations did not always prove to be an effective means for providing, delivering, or paying for medical services. Preferred Provider Organization (PPO) networks came in to existence. A PPO enters into network contracts with medical service providers who agree to provide medical services to employers who agreed to be participate with the PPO network. The employer or a self insured ERISA plan may enter into a contract with the PPO network plan, or the contract to access the PPO network may be entered into by a third party administrator (TPA) who administers the plan on behalf of the sponsoring employer.

Large non-self-insured corporations also enter into agreements with PPO network plans. A PPO network system provides a large volume of patients to the medical service providers in the PPO network and in return or exchange the medical service provider gives a negotiated or predetermined discount on the billed medical charges to the employer.

Over time, since the inception of the PPO network system business model, medical service providers have hired specialists and consultants to help and advise them on techniques for increasing their overall collections. As a result, PPOs and Medical Service Provider members thereof have inflated their charges for medical services to such an extent that they are no longer providing a "real" discount for many medical services that are provided to the employees of self-insured employers. Some refer to what has happened in the PPO arena as a cost shifting mechanism by which the medical service providers are purportedly making up for service fees that are not collected from Medicare and from indigent patients (i.e., the lost costs are being shifted to commercial payers in order to make up for uncollected service fees and to increase profits). This shifting of costs is having a tremendous financial impact on the ability of commercial payers and employers. The commercial payer's and employer's ability to offer medical benefits under a PPO network system plan is being strained because the charges that are being passed onto the commercial payers and employers do not have a rational relationship with the actual cost or a reasonable profit margin for delivery of the medical services that are being paid per the PPO network discount. As such, PPO networks are no longer an asset to an employer and have turned into a detriment because the cost of the medical services under the PPO network plans has escalated so high that in many instances there is not a real discount for the medical services provided. Furthermore, PPO network medical service providers are using their PPO network contracts to circumvent ERISA by claiming that they have a separate legal right to recover unpaid portions of the excessive charges that they are charging for services.

Now that PPO medical service providers are using their PPO contracts to circumvent ERISA and claim that they have a separate legal right to recover unpaid charges (the excessive charges) being charged for services under certain language in a PPO network service contract, the self insured employers are encountering new problems that were not present when the PPO networks were first established. For example, now the self insured employers and/or employees of the self insured insurers are being asked to pay the difference between the amount that a medical benefit plan is willing to pay via the PPO and what the medical service provider is asking for as payment. This is having less impact on large PPO network service providers like Blue Cross-Blue Shield, Aetna, or United Health because of the contract terms they are able to demand given their strong bargaining position due to the number of patients that they can channel to selected medical service providers.

This problem with medical service providers is especially impacting self insured employers who do not have the negotiation power or leverage of the large PPO network service providers because the self insured employer can only channel a limited number of patients to the medical service providers.

To date, the medical service providers continue to be very unreasonable with respect to cost shifting. In various circumstances, medical service providers have admitted to using various cost shifting tactics to make up for the lost revenue from Medicare and indigent patients. For example, the cost of an implant used in an implant procedure may be marked up 800%, and four implant devices may be billed for a procedure that only requires two of the four, but the patient is charged for all four. Patients may be billed via an inappropriate bundling of charges, such as paying for an entire box of syringes when only one syringe was used. Patients may also be billed for inappropriate unbundled charges, for example, for equipment or products used during a medical procedure in an operating room when the equipment is normally included as part of the operating room facility fee and there is not normally an extra charge for the equipment used to perform that particular medical procedure. In many circumstances the medical service providers acknowledge that they are engaging in unreasonable billing tactics, but will not negotiate for lower medical service charges with a TPA who administers an employer sponsored medical benefit plan. In some circumstances, the medical service provider, who is relying on the PPO contract language, will threaten to charge the patient/employee for any unpaid medical charges by the medical benefit plan. Such unpaid charges, that are in excess of normal PPO contract acceptable charges, can be in the tens of thousands of dollars. Such an amount is more than what an employee is expecting to be charged or is prepared to be charged as part of their normal deductible, co-payment and/or self-pay obligations. One can imagine the amount of stress created when a patient receives a $40,000 hospital bill because the PPO network medical benefit plan, which their self insured employer is part of, believes that the charges are excessive and did not pay and because the medical service provider will not participate in a good faith resolution of the problem with the TPA.

In a nutshell and with respect to a self insured employer, there are generally two contracts of note in a PPO network contract. A first contract is between the medical service provider and the PPO medical network organization. The PPO medical network organization executes a second contract between the PPO medical network organization and a TPA or the self-insured plan that allows the TPA and/or the self insured medical benefit plan of an employer to have access to the PPO medical network and pay a discounted rated for the medical services provided. The PPO organization is in between the medical service providers and the TPAs and/or plan. The PPO generally does not screen or review the medical bills sent by the medical service providers to a TPA and/or plan. When there is a problem or dispute between the TPA/plan and a medical service provider, the PPO tends to remain neutral due to its conflict of interest with respect to both parties. In many circumstances, the PPO tends to be adverse to the TPA, because the PPO does not want to lose the medical service provider from its PPO network of medical service providers.

Therefore, what is needed is a medical benefit plan for self insured employers to provide their employees that allows the medical benefit plan to pay a reasonable value for medical services and products provided under the plan, and also protects the employees from paying additional fees to medical service providers who want to collect more than a reasonable amount for their services. Self insured employers may eventually have to cease using PPO medical service networks to control medical costs because the PPO medical service networks are no longer advantageous as a means for reducing or controlling medical costs incurred by the self insured employer's medical benefit plan. There needs to be a new medical benefit plan designed for self insured employers that could provide some of the benefits that a PPO medical network plan initially provided, such as for example, avoiding billing the patient for a balance that was not paid by the medical benefit plan or the TPA. Also it would be advantageous to have the self insured employer cover 100% of the benefits payable under the new medical benefit plan so that the employee is covered by ERISA. An additional high-value advantage to such a plan to medical service providers is that they are paid in full promptly by the plan and avoid having to collect from individual patients. The medical benefit plan should define how benefits are payable through a definition of reasonable value that takes into account a mathematical, statistical or comparative calculation of value based on public and privately provided data points. Furthermore what is needed after a reasonable value is calculated and determined as appropriate payment to the medical service provider, is for the employer, plan and/or TPA to be able to protect the employee from collection activity or law suits originated by a medical service provider for a difference between 100% of the medical service provider's billed charges and the amount that is determined by the new medical benefit plan as a reasonable value for the medical services or products rendered.

SUMMARY OF THE INVENTION

In view of the limitations and shortcomings of the aforementioned medical benefit plans provided by self insured employers wherein the charges and costs for medical services from medical service providers are not being reined in to a reasonable value for the provided medical services. And, further wherein a medical service provider can circumvent a PPO agreement and take action against an employee or participant of a self insured medical benefit plan to collect a payment above and beyond the amount of payment paid by the employee's medical benefit plan and the employee. Therefore it is apparent that there exists a need for a new type of self insured medical benefit plan that establishes a reasonable value for medical services provided to a participant in the plan and protects the participants of the plan from actions by medical service providers in attempts to collect additional payment from the participants of the medical benefit plan.

In an exemplary embodiment, a medical benefit plan is provided by an employer wherein the medical benefit plan is a self insured medical benefit plan that is governed by ERISA and sponsored by the employer. The medical benefit plan being provided is 100 percent responsible for payment to a medical service provider for an amount owed to the medical service provider for covered medical services rendered for an employee of the employer under the medical benefit plan. In order to administer an exemplary self insured medical benefit plan a method is provided where an administrator of the ERISA medical benefit plan (EMBP) receives a medical service bill for an amount after covered medical services have been rendered to a plan beneficiary under the EMBP. In response to receiving the medical service bill, the administrator, who may be a third party administrator, requests that a medical service bill evaluation be performed to evaluate the medical service bill provided by the medical service provider. The medical service bill evaluation is to be performed according to predetermined criteria of which is defined at least in part in the EMBP plan documents.

The medical service bill evaluation may comprise preparing a repriced medical service bill along with an explanation for the repricing of the medical service bill. The repriced medical service bill may be repriced to an amount that is less than the original amount billed by the medical service provider for the medical service provided to the employee. A payment may be arranged for the medical service provider that comprises the repriced amount as a full payment for the covered medical services that were rendered to the employee. An explanation for the repriced medical service bill may also be provided to the medical service provider along with ERISA claim denial language that supports the complete or partial denial of the full payment of the original amount that the medical service provider billed and further supports the repriced amount that is being paid to the medical service provider, together with language per Uniform Commercial Code accord and satisfaction requirements. The repriced amount may be considered a reasonable value, consistent with the payment standards set forth in the plan documents, for the medical services provided to the employee under the EMBP. If the medical service provider takes action toward the employee for additional amounts of payment over or above the repriced amount that has been paid to the medical service provider, the EMBP, or an affiliate thereof, will defend the employee against the medical service provider for such a claim. The EMBP will also indemnify the employee for any legal determination indicating that the medical service provider is owed an amount in addition to the repriced amount that has already been paid to the medical service provider. It is also contemplated that if an employee or participant is to pay any portion of the repriced amount for the services provided by the medical services provider, then the employee will pay his or her portion to the EMBP directly or via the EMBP's administrator.

In some embodiments of the invention the medical service provider's medical service bill is evaluated by a repricing cost containment entity. The evaluation of the medical service bill may involve evaluating each line item or element in the medical service bill and comparing each line item to data in a database that comprises comparable medical service cost data. The comparable medical service cost data may include the accepted payments for the same or substantially similar medical services provided by the same or other medical service providers. Such predetermined other medical service providers may be of the same type, same caliber, located in the same geographical area, similar geographical area, or be similarly equipped as the medical service provider whose medical service bill is being evaluated. The repricing cost containment entity compares each medical service line item or element in the medical bill, and calculates a reasonable value for the medical service line item or element based on the comparable medical service cost data. The comparing of the comparable medical service cost data with the medical service bill that is being evaluated is generally done in accordance with the requirements for a reasonable value for services rendered as defined or provided in the EMBP plan documents. The repricing cost containment entity may also prepare a repriced medical service bill for the EMBP or its administrator that includes the reasonable value for the medical service line item and/or element along with an explanation for the repriced medical service bill that includes ERISA acceptable claims denial language further supporting the non payment or decreased payment of the medical service line item within the repriced medical service bill and required UCC accord and satisfaction language.

In various embodiments of the invention the repricing cost containment entity may use additional or a combination of additional means for analyzing one or more line items of a medical service provider's medical service bill. Such additional means or criteria for analyzing may comprise an analysis of any of the following, but not be limited to a cost-to-charge ratio calculation for the covered medical services provided by the medical service provider. A costs analysis of the coverered medical services provided by the medical service provider. A means for analyzing may comprise a profit margin analysis for the covered medical services provided by the medical service provider. Still yet another means for analyzing the medical service provider's medical service bill is the comparison of the payments being made for similar covered medical services provided from or by similar types of other medical service providers (e.g. hospitals with hospitals, emergency room service with emergency room service).

In other embodiments, a self insured medical benefit plan that is governed by ERISA is sponsored by an employer to benefit a plan participant. The employer may use an administrator to administrate the ERISA medical business plan (EMBP). In this embodiment a medical service provider provides a medical service bill, for medical services provided to the employee, to the administrator. The medical service provider's medical service bill is then repriced in accordance with an exemplary method of repricing the medical service bill. The repricing of the medical service bill is performed by a repricing entity for the purpose of establishing a reasonable value for the billed medical services. The method of repricing involves a repricing entity receiving the medical service bill for the medical services provided to the employee of the employer who is providing the EMBP. An evaluation of the medical service bill is performed. The evaluation comprises reviewing a line item of the medical service bill, wherein the line item comprises a description and a medical service provider's charge for a service or product. The evaluation may also include reviewing each product on the medical service bill. The charge is then compared with data from a plurality of databases wherein one or more of the databases comprise comparable medical service provider charge data for the same service or a same product that was provided by the medical service provider and/or by other medical service providers. The repricing entity, based on the comparison of the data determines a reasonable value of the billed service or product. The repricing entity prepares a repriced bill with a reduced total charge based on a repricing of one or more medical services or products provided to the employee. The repricing may be performed if the charge made by the medical service provider is outside of a standard or defined deviation or predetermined maximum for that charge and/or a higher-than-average charge for the same or similar services provided by comparable medical service providers. The repriced amount for a line item or medical service is considered to be a "reasonable value" for the medical services provided. The reasonable value for the medical service provided is recommended to the EMBP or its administrator as an amount to pay the medical service provider for the medical services provided to the employee. The repricing entity may also provide an explanation for the recommended decrease in or denial of the medical service provider's bill. Such explanation may further include acceptable ERISA claim denial or partial claim denial language and accord and satisfaction text meeting UCC requirements. In other embodiments of the invention, the medical service provider may provide the medical service bill in an electronic form to the administrator, the EMBP or other related entities in the transaction. The EMBP or the repricing cost containment entity may receive the electronic medical service bill and modify or create additional electronic files using the information in the medical service provider's electronic medical service bill along with the repricing, analysis, explanation of repricing, ERISA denial language, and UCC accord and satisfaction language to create additional files associated with the payment, partial payment, or non payment of the medical service bill.

Still yet in other embodiments of the invention, an ERISA medical benefit plan (EMBP) is sponsored by an employer for the benefit of a plan participant wherein the EMBP comprises funds for payment of medical services provided by a medical service provider to the employee. The exemplary method comprises repricing of the medical service provider bill for medical services provided to the plan beneficiary. The method of repricing the medical service provider bill comprises receiving and storing the medical service provider bill data in a computer system. The medical service bill data comprises a description of a medical service, a code for the medical service, and a charge for the medical service. The method further comprises scrubbing the medical service provider bill for medical service code errors and other possible data entry errors that may cause a denial of all of part of a payment for the medical service that was provided. The method may further provide for analyzing the medical service bill data with respect to an estimated cost plus profit margin for the provided medical services and then determine if the estimated cost plus profit margin is greater than a predetermined maximum allowable amount as specified by the TTA or in the EMBP. If the percentages are above the predetermined maximum then a repricing of the medical service may be suggested. In other embodiments of the invention, if the bill for the medical services is a predetermined percentage above the mean or normal amount charged by comparable other medical service providers for the same or similar medical services or products then a repricing of the medical service may be required in order to reprice the service to a reasonable value for the medical services provided. As such, the medical service provider bill data is compared with medical service cost database data and it is determined if the charge for the medical service is within a predetermined range or acceptable charges for a same or similar description of the medical service provided or a same or similar medical code for the medical service provided to the plan beneficiary.

Again, in various embodiments, the employee is not required to pay the medical service provider for the medical services provided by the medical service provider. Instead, the EMBP provides a benefit to the plan beneficiary of paying 100 percent of the reasonable value for the medical service provider's bills. Furthermore, an exemplary EMBP, as discussed and described in its various embodiments herein, will protect both the employer and plan beneficiaries under ERISA such that the plan beneficiary is indemnified against attempted collections from a medical service provider who attempts to collect amounts that may arguably exceed the reasonable value of the medical services provided or the repriced amount that was paid by the EMBP.

As such, the various embodiments of the present EMBP and methods for administering an EMBP protect a plan beneficiary under ERISA and require that a medical service provider can collect no more than a reasonable value for the medical services provided to a participant in the EMBP.

BRIEF DESCRIPTION OF THE DRAWINGS

For a more complete understanding of the present invention and the advantages thereof, reference is now made to the following description taken in conjunction with the accompanying Drawings in which:

FIGS. 2A-2E illustrates a flow chart that provides various embodiments of the exemplary EMBP and methods of administering the same.

DETAILED DESCRIPTION

Figure 1:
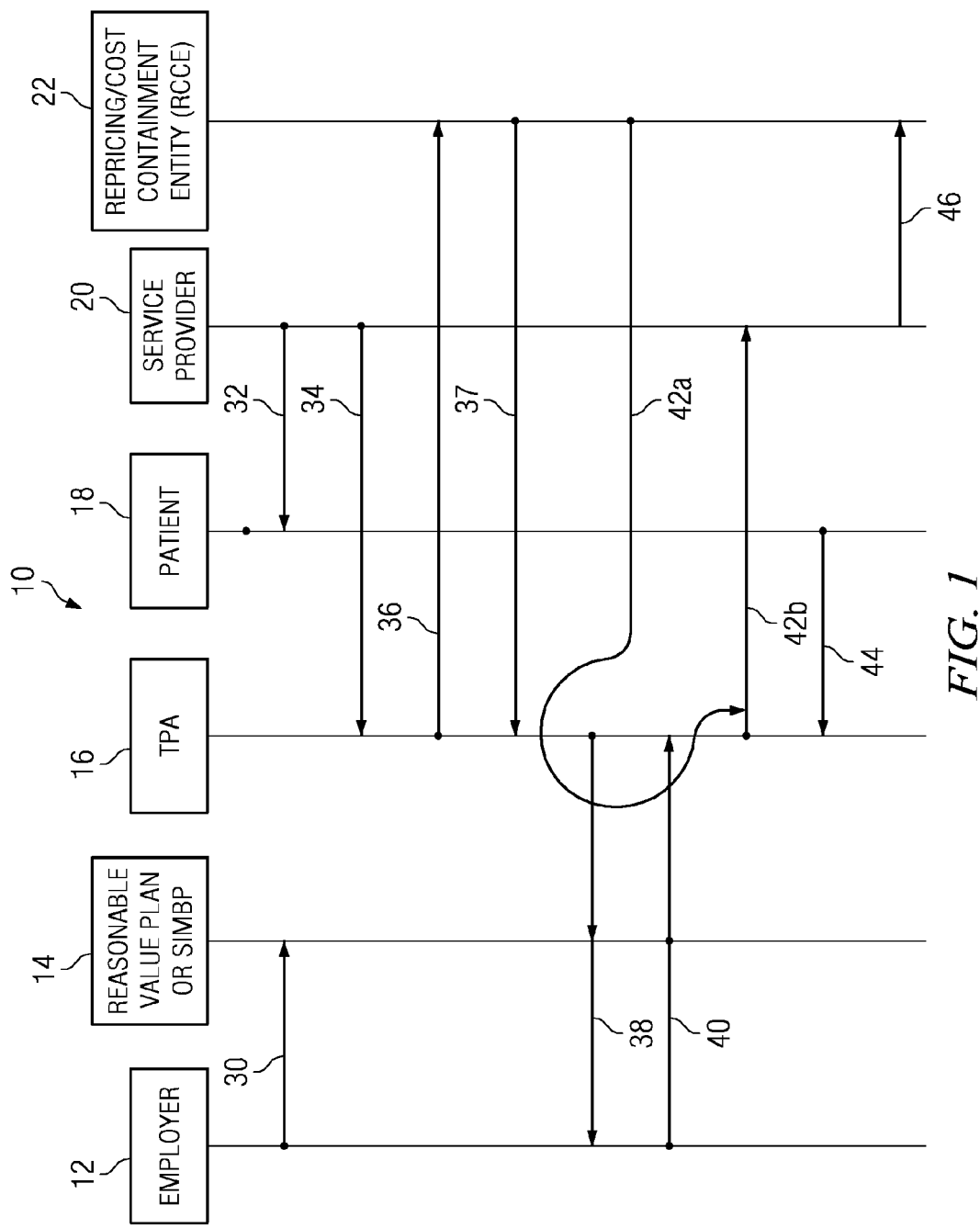
FIG. 1 illustrates an exemplary diagram that shows interactions between various entities associated with exemplary EMBPs and methods for administering the same.
Figure 2E:
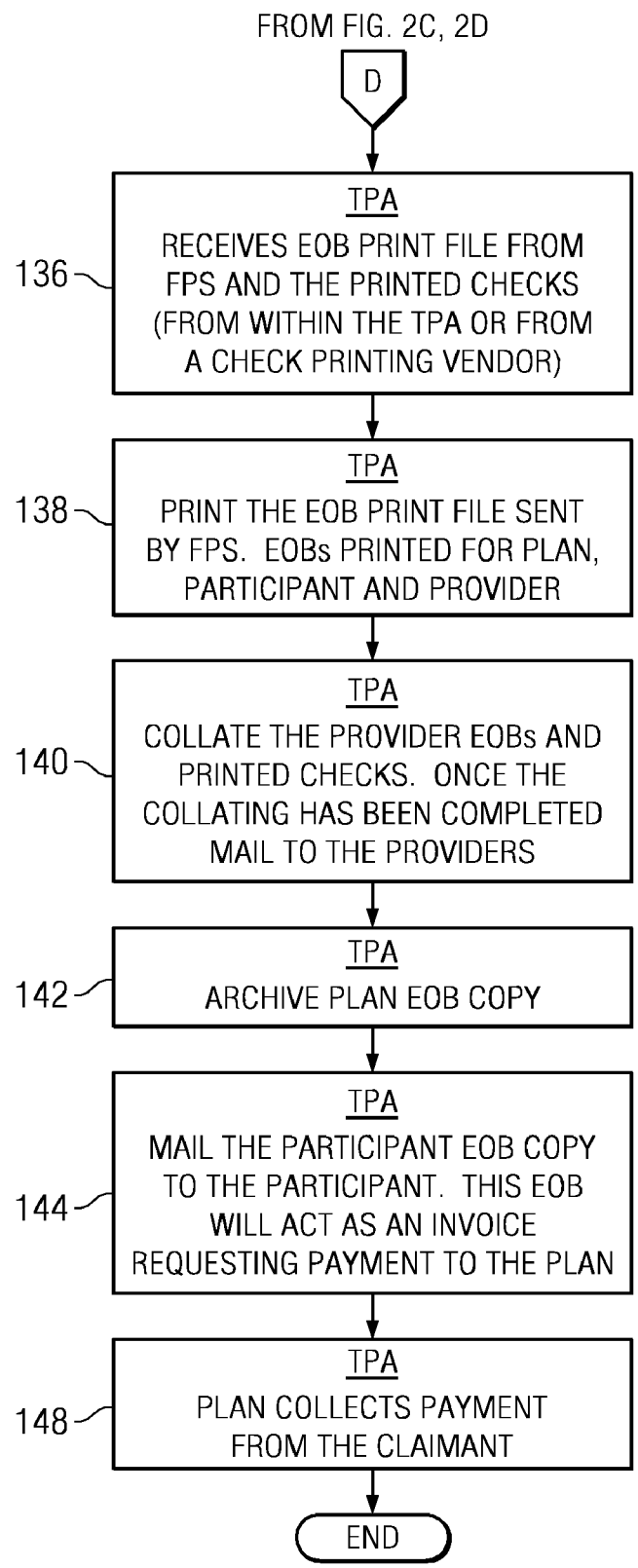

Referring now to the drawings, wherein like reference numbers are used herein to designate like elements throughout the various views, embodiments, and other possible variations of the present invention. The figures are not necessarily drawn to scale, and in some instances the drawings have been exaggerated and/or simplified in places for illustrative clarity purposes only. For example, the computer systems and data storage facilities of the various entities are not specifically shown but are understood to exist. One of ordinary skill in the art will appreciate the many possible applications and variations of the embodiments based on the following examples.

In an embodiment of an exemplary medical benefit plan for a self insured employer under ERISA, the medical benefit plan can be designed and implemented to review medical service provider bills in order to eliminate billing errors, coding errors, and improperly unbundled or bundled charges. The exemplary medical benefit plan defines the payment obligation of the medical benefit plan to the medical service provider. The payment obligation of the medical benefit plan is calculated in terms of the reasonable value of the medical services provided to a participant of the medical benefit plan. The reasonable value of the medical services provided is determined by a comparison of a billed amount with several data points, that may include, but not be limited to, the amount of payment that other medical service providers are accepting for the same medical services in the same or similar economic geographical area from various commercial payers, an analysis of the medical service provider's costs, costs to charge ratio, profit margin on patient services, as well as a possible comparison of the charges, payments, profit margins and circumstances with other private proprietary and public data bases. A medical service provider may be any individual, entity and/or facility that may provide services under the medical benefit plan (a hospital, doctor office, surgical center, outpatient center, rehabilitation facility, ambulance, lab, x-ray/imaging facility etc.)

An exemplary part of the present invention and method relates to the fact that in prior PPO network plans and other prior medical benefit plans for self insured employers, medical service provider charges were usually determined in an unregulated, somewhat arbitrary, and un-audited fashion. In previous PPO network plans and medical service plans, the medical service provider was not required to justify or substantiate how it calculated or determined the various claimed charges or claimed total charge for the medical services provided to the patient. Furthermore, previous PPO contracts did not require that the PPO, or any other entity examine the charges that the medical service provider submitted to determine whether the charges were valid, invalid, fraudulent, inflated, bundled or otherwise appropriate or not abusive. Basically, previous PPO networks did not conduct and were not required to conduct due diligence into the appropriateness of the medical service charges of the various medical service providers. However, whatever discount (e.g., 10%, 20%) a PPO network negotiated with medical service provider no longer protects the ultimate payer (i.e., the medical benefit plan, the employer, the employee and plan participants) from the medical service charges being inflated or unjustified charges of any kind. As such, various embodiments of this invention offer a method and/or business method for protecting a plan beneficiary of a self insured employer from potentially being over charged for medical services and other invalid medical billing practices that are presently rampant in existing PPO medical service plans.

In an embodiment a reasonable value for the medical services or products provided to the plan participant is determined and then a recommendation for payment is made to the self insured medical business plan or its administrator. The recommendation for payment may be made in the form of or include an explanation of review, which provides reasons for paying an amount to the medical service provider that is less than what the medical service provider billed. An exemplary explanation of review will conform to the claims procedures under ERISA and will state the specific reasons for the partial or full denial of payment for the medical services. The explanation of review may also cite the language in the medical benefit plan that supports the partial denial of a medical service claim along with other elements that are legally necessary for a partial denial of payment claim. Embodiments of an exemplary ERISA governed Self Insured Medical Benefit Plan for a self insured employer may be referred to herein as a "Reasonable Value Plan" or a "EMBP."

Furthermore, various exemplary Reasonable Value Plans indemnify the employee/participant from any collection activity or law suit that the employee/participant may receive from the medical service provider. Exemplary EMBPs may also defend the patient employee/participant from the medical service provider with respect to any collection activity or law suit.

Referring to Table 1, a comparison of existing and an exemplary medical benefit plan type are shown. A comparison of PPO medical services plan, a standard ERISA plan and an exemplary Reasonable Value Plan are shown. The "Billed by Service Provider" column indicates the amount of money a medical service provider billed or claimed for a medical service or product provided to a patient. Table 1 indicates that in each example, a medical service provider billed $100,000 for medical services or products provided to an EMBP participant. The medical services or products could be for, for example, a transplant, an artificial limb, a cancer related operation, drug or treatment, a blood transfusion, a MRI, a general medical check-up, a neurological condition, a cardiac related condition, a bodily function condition, a physiological condition, an orthopedic condition, or substantially any medical condition (new or ongoing) that an employee or participant may have that is or may be covered by an exemplary EMBP.

Still referring to Table 1, the "Discount Established by the Plan" column indicates that an existing ERISA PPO medical benefit plan contracted with the medical service provider in order to obtain a 20% discount off the amount billed by its participating medical service provider(s). The PPO is not required to review and generally does not review the medical service provider's bills for inaccuracies, overcharges, fraudulent charges, unbundled charges, inflated charges, inappropriate charges or other discrepancies. The PPO, based on the established 20% discount, generally automatically accepts a service provider bill and determines that the medical service provider is owed $80,000 (i.e., $100,000—20%) for the medical services or products provided to a plan beneficiary under a previous self insured PPO medical benefit plan.

TABLE 1

Reasonable Value Medical Service Plan for Self Insured Employees

| Plan Type | Billed By Service Provider | Discount | Owe to Service Provider | % Responsible for Payment | Payments |
|---|---|---|---|---|---|
| Generic ERISA Plan | $100,000 | 0% | $100,000 | 80% Employer | $80,000 |
| | | | | 20% Employee | $20,000* |
| ERISA PPO Plan | $100,000 | 20% PPO Discount | $80,000 | 80% Employer | $64,000 |
| | | | | 20% Employee | $16,000* |
| Reasonable Value Plan | $100,000 | Repriced to Reasonable Value | $60,000 | 100% Employer to Med Serv Provider | $60,000 |
| | | | | 20% Employee to Real Value Plan | $12,000* |

*May not include co-payment amounts by Employee

The PPO network service does not have any payment obligation to the medical service provider and does not require or provide advanced funding for the medical service provider's bill. The PPO network service receives the bill from the medical service provider electronically or in a written format. Still referring to Table 1, the PPO network service creates and advances a document or advises a Third Party Administrator (TPA) electronically or otherwise that for a particular employee/participant there were medical treatment charges for $100,000, that the established PPO discount is 20%, and that the medical service provider is owed $80,000 under the employee's PPO medical benefit plan. A TPA, in general, performs claim administration and related business functions for a self-insured entity. A TPA may, in some circumstances, be responsible for making payments to medical service providers on behalf of a group health plan (i.e., medical benefit plan).

Assuming in this example that the self insured PPO medical benefit plan has an employer/employee payment responsibility split of, 80% owed by the employer and 20% owed by the employee, then the employer's self insured medical benefit plan would owe and be responsible for $64,000 and the employee would owe and be responsible for paying $16,000 of the bill to the medical service provider.

Still referring to Table 1, another example is provided with respect to a standard self-insured medical benefit plan wherein an employee received medical services, billed at $100,000, from a medical service provider. There is no discount for the medical services provided under the standard medical benefit plan and $100,000 is demanded by the medical service provider. The TPA of this standard medical benefit plan has limited, if any, negotiation power with the medical service provider due to the small number of employees and potential patients participating in the standard medical benefit plan. In this example, the self insured employer/employee responsibility for paying the medical service provider is also 80%/20%. Thus, the self insured employer's standard plan would be responsible to the medical service provider for $80,000 and the plan beneficiary would be responsible for paying the medical service provider $20,000 of the bill.

Still referring to Table 1, under an exemplary embodiment of an EMBP, an employee received medical services billed at $100,000 from a medical service provider. There is no PPO service network contract between a PPO and the TPA, who is acting on behalf of the EMBP. There is also no arrangement between a PPO and the medical service provider. In this embodiment, a PPO service network is not used. Instead, the exemplary EMBP uses a third party cost containment entity for analyzing a medical service provider's charges and for providing a recommendation of a reasonable value for the medical service provider's services.

For example, and still referring to Table 1, even though the bill from the medical service provider is $100,000, the third party cost containment entity calculates and recommends to the TPA of the EMBP a reasonable value for the medical services provided. In this example the third party cost containment entity determines that the reasonable value of the services provided by the medical service provider is $60,000 (i.e., the medical service bill is $40,000 larger than a reasonable amount for the services provided). The cost containment entity also supports the recommended repriced reasonable value of the medical services by providing factual based reasoning in the form of an Explanation of Review (EOR) along with appropriate claim denial or partial denial language that is in accordance with ERISA to the TPA and UCC accord and satisfaction language. In an exemplary EMBP, the plan participant would not be responsible for paying the medical service provider a 20% portion (in this example) of the medical service provider's bill. Instead, the plan participant pays 20% of the $60,000 (20% of the reasonable value of the services) or $12,000 to the EMBP. The payment may be made by the plan participant to the EMBP via the TPA. The exemplary EMBP takes responsibility for paying 100% of the reasonable amount owed to the medical service provider (e.g., the EMBP pays $60,000, via the administration of the TPA, to the medical service provider). The exemplary EMBP also will protect and indemnify the plan participant from subsequent claims by the medical service provider for amounts owed above the paid reasonable value of the provided medical services.

It is understood that exemplary EMBPs may or may not include a co-payment paid by the patient/participant to the medical service provider at the time that the medical services were rendered. Such a co-payment may be from about five dollars to about $500 dollars and are generally paid at the time of service, rather than afterward when a medical service provider's bill for services is submitted for payment. Co-payments may be credited or reimbursed to the employee/participant by the EMBP.

In an embodiment of the present invention, an employee is covered under ERISA and can be indemnified by the exemplary medical benefit plan since the medical benefit plan has accepted responsibility—by amending its plan documents to specifically create a benefit to the participant—for paying 100% of what is owed to the medical service provider. Also, unlike prior ERISA based medical benefit plans wherein the employee is responsible for paying a portion of the medical service provider's bill directly to the medical service provider, an exemplary EMBP removes the employee's payment responsibility to the medical service provider. An exemplary EMBP also provides a legal defense for the employee against any medical provider collection actions. Under ERISA and because an exemplary EMBP requires that the employer or the employer funded EMBP pay 100% of the amount owed to the medical service provider, the exemplary EMBP may also agree to and/or be required to indemnify the plan beneficiary against a law suit, filed by the medical service provider against the plan beneficiary, that requests the plan beneficiary to pay an additional amount over the recommended, repriced, reasonable value already paid by the EMBP to the medical service provider. An exemplary EMBP will also be responsible for paying additional amounts owed, if necessary, to the medical service provider.

Under various embodiments of the exemplary medical benefit plan, by means of the UCC accord and satisfaction notice, the medical service provider is stopped from pursuing the plan participant for any additional payment or non-payment by the plan participant to the medical service provider for the medical services.

Generally speaking, a medical service provider does not prefer to pursue collections of unpaid medical charges from unpaid medical services from its patients. Realistically, most patients do not have 80,000 dollars to pay hospital charges or other bills from medical service providers. An ideal situation for a medical service provider is to collect all payments due for services provided to a plan participant of a medical benefit plan from a medical benefit plan itself, or from a fund created to fund the claims made under the medical benefit plan. Such a situation is ideal because the moneys from the medical benefit plan or the fund created thereunder are specifically set aside for the payment of medical service provider claims related to plan participants of the particular medical benefit plan. But, in some recent situations, when a medical benefit plan resists total payment for the medical services provided to plan participants of the medical benefit plan due to billing errors/medical service coding errors, unbundled charges, unjustifiably high charges for services or products, inappropriate or possibly fraudulent charges, or otherwise, the medical service provider may pursue a claim against the plan participant for the unpaid charges. That is, in the present environment, without the use of embodiments of an exemplary EMBP, medical service providers often go after the patient plan participant for additional payment of the medical services provided.

For example, in the present environment, when a patient goes into a hospital, a patient signs a document as part of their admittance processing when they arrive and are admitted at the hospital or other medical service provider. The document that they sign has within it terms of the financial responsibility of the patient. The document also contains a portion or clause referred to as an Assignment of Benefits (AOB) clause. The AOB clause basically states that the medical service provider will render medical services to the patient upon admittance, and in exchange therefore, the patient assigns the medical benefits that the patient employee/participant is entitled to under the patient's medical benefit plan over to the medical service provider so that the medical service provider may contact and receive payment for the medical service claims from the patient's medical benefit plan or employer. The medical service provider need not go through the patient employee/participant to collect the medical service claims or fees. If the medical service provider does not obtain complete payment for medical services and products via the AOB process, then the medical service providers may circumvent the AOB process by referring to a PPO Agreement that stands between the medical service provider and the medical benefit plan. The medical service provider may file a lawsuit in such a way stating that they are suing the both the plan participant and the plan under an independent contract right as a party to the PPO agreement rather than with a claim that they are an assignee of the employee's medical benefit plan's benefits. As such, the medical service provider can use contract law to pursue the patient employee/participant of a medical benefit plan that used a PPO as part of a self-insured medical benefit plan covered by ERISA. Embodiments of the present invention stop the medical service provider from pursuing payment directly from the employee/participant of an exemplary EMBP because the EMBP is responsible for 100% of the payment, and ERISA is thereby used to protect the employee.

In embodiments of the present invention and method, the EMBP forces a medical service provider to only be able to pursue a claim for the unpaid portion of a medical service provider's bill from the EMBP as an Assignee of Benefits (AOB). By being limited to an Assignee of Benefits, a medical service provider's recovery for unpaid portions of a medical service claim is limited to what the employee/participant of an exemplary EMBP would have been entitled to provide the medical service provider under the EMBP.

In some embodiments, an exemplary EMBP avoids the use of a PPO agreement and creates a 100 percent medical benefit payment for medical services provided to an employee/participant under the plan. Embodiments may also force the medical service provider to pursue collection of any charges, bills, or claims, only as an Assignee of Benefits (AOB) from the exemplary EMBP itself. This function affords not only the patient employee/participant, but also the EMBP, all the protections of ERISA. The protections of ERISA provide that a Federal or State Court having concurrent jurisdiction will determine whether or not payment made by an exemplary EMBP was "arbitrary or capricious" based upon the medical benefit plan's uniform interpretation of its own provisions and uniform filing of the terms of the medical benefit plan. A key benefit of an exemplary EMBP is that by requiring a medical service provider to make an ERISA based claim instead of a state law claim, then the standard of review for an ERISA claim against the exemplary EMBP or an employee/participant of the EMBP is much more favorable under an ERISA context. The "arbitrary and capricious standard" is very favorable to the employee/participant, as well as to the EMBP.

Referring now to FIG. 1, an exemplary flow diagram is provided that shows interactions between the various entities associated with an exemplary Reasonable Value Plan or EMBP. One entity associated with an exemplary EMBP or an exemplary method of providing a self-insured medical business plan 10 is an employer 12 who is a self-insured employer and sponsors an ERISA based EMBP 14 in accordance with an embodiment of the present invention. Another entity associated with an embodiment of the present business method 10 is the exemplary Reasonable Value Plan or EMBP 14. The exemplary EMBP 14 is essentially an ERISA covered or governed medical benefit plan that provides a definition for a reasonable value of medical services or products provided by a medical service provider. The definition of reasonable value of services or products is used in the EMBP 14 to define the scope of the employer's payment responsibility to a medical service provider 20 for services or products provided to an employee or participant 18 in the employer's EMBP. Furthermore, the EMBP 14 establishes a 100 percent medical benefit to the participating employees and participants. Participants in the EMBP 14 may be significant others, such as spouses and/or dependents of the employee. The third entity in Table 1 is the EMBP administrator; the EMBP administrator 16 may be a individual or an entity that is part of the employer's company or, more commonly, be a third-party administrator (TPA) 16, which is a service provider contracted by the employer 12 who performs claims management, and administrative services for a medical benefit plan such a the exemplary EMBP 14 as well as, perhaps, other medical benefit plans provided by one or more other employers.

In embodiments of the business method 10 the TPA 16 performs medical benefit claim administration and related business functions for the self-insured employer or entity 12. The TPA 16 may also be responsible for making payments on behalf of the exemplary EMBP 14. The employer 12 may set up and fund a EMBP fund or a trust fund for the purpose of providing moneys to pay medical service provider claims made to the EMBP 14. The TPA 16 may further administer the fund for payment of medical service provider claims.

The patient 18 may be an employee, the spouse of the employee, or a dependent of the employee or another beneficiary of the exemplary EMBP 14. The medical service provider 20 is the entity, person or business that renders treatment, services, or provides medical service related product to the patient or other beneficiary of the EMBP 14. The service provider 20 may be a doctor, a doctor's office, a hospital, a surgical office, a medical product manufacturer, a prescription distributor or pharmacy, a temporary care or nursing home service provider, a dentist, psychiatrist, neurologist, or substantially any other medical service provider or product provider related entity that may be responsible for providing medical services to a patient 18 that is covered under an exemplary EMBP 14.

The Repricing/Cost Containment Entity (RCCE) 22 is a business or other type of entity that may create or help to define the language of the EMBP 14, that defines how the reasonable value of the medical services are determined, and that aids in the creation of the EMBP documents and definitions that are supplied to the employer 12 and TPA 16 in order to establish the EMBP 14. The RCCE 22 also provides, in various embodiments, the negotiation, the support or service for adjudication, the maintenance of databases, the analysis related to the repricing of medical services, and the analysis used to determine the reasonable value of the medical services provided to a patient employee/participant 18 of the EMBP 14.

In certain circumstances, it is advantageous for an employer 12 to establish a medical benefit plan for its employees 18 that is funded by the employer 12. Such a medical benefit plan may be referred to as a self-insured medical benefit plan EMBP 14. In step 30 an employer who has decided to fund its own medical benefit plan establishes a exemplary Reasonable Value Plan or EMBP 14. In step 30 the employer or self-insured employer 12 funds the EMBP 14. The employer 12 may also be referred to as the plan sponsor. The employer or plan sponsor 12 sets up the EMBP 14. As part of setting up the EMBP 14, the employer 12 is ultimately responsible for funding the medical service claims or product claims that are made under the provisions of the EMBP 14.

At step 32, a medical service provider 20 provides medical services or products to a patient 18 who is a beneficiary under the Reasonable Value Plan or EMBP 14. For example, the medical service may comprise treatment for a heart attack, transplant, surgery, or any type of EMBP covered medical treatment that could be provided to a patient 18.

It is understood that at the beginning, during admission to, or prior to the beginning of any medical service being provided to the patient 18 that the patient may or may not be required to pay a co-pay amount to the medical service provider 20. The co-pay amount may be a relatively small amount of money in comparison to overall cost of the medical service being provided by the medical service provider. For example, a co-pay may range from $2 to about $500. Such a co-pay may be a required part of the EMBP 14, but would be considered a limitation or deduction of what a patient 18 is responsible for paying the EMBP for benefits related to medical services provided by the medical service provider or may be effectively reimbursed to the patient by the EMBP in the form of a credit toward any amount owed by the patient 18 to the exemplary EMBP. Thus it is understood that the exemplary EMBP 14 is responsible for effectively providing the patient a 100 percent medical benefit plan.

At step 34, the medical service provider 20, who provided the medical service for products to the patient 18, files a claim either electronically or in hard copy with the TPA 16 for the medical services or products provided to the patient 18.

As part of its medical service claims administration responsibility, the TPA 16 would make a determination as the whether the medical service or product claim is eligible for payment under the particular restrictions and conditions of the EMBP 15 language. To aid the TPA 16 in such a determination the TPA 16 may refer the medical service provider's claim or bill either electronically or in hard copy to the RCCE 22 for evaluation and repricing in step 36. The RCCE 22 receives the medical service or product claim that originated from the medical service provider 20 and then performs various reviews and analysis of each service or product line item in the medical service provider's bill or claim. The review and analysis ("repricing" or adjudication") of each line item of the total medical service provider's bill is done according to the terms and conditions of the exemplary EMBP language that the TPA 16 may have supplied to the RCCE 14. Such repricing adjudication requirements supplied by the TPA to the RCCE may either match or substantially match the recommendations of that were provided by the RCCE 22 to the employer 12 when the EMBP 14 was being created and funded by the employer. The evaluation and comparison of all the items, medical services and/or products found in a medical service claim is done in order to establish a reasonable value for one or more of the service or products provided by the medical service provider 20 to the patient 18.

The RCCE 22 may perform scrubbing and repricing of the medical service provider's bill. Scrubbing of the medical service provider's claim or bill may include determining whether the physician or medical service provider is licensed to perform the provided medical services, validating that the billing codes for the medical services or products provided are valid billing codes under the exemplary EMBP plan, performing LMRP (NCD/LCD) checking of each line item in the medical service provider's bill, performing fraud checking on the physician and/or medical service provider's billing and history of previous billings, and comparing each line item to historic medical service cost data for the same or similar medical services or products provided by this same medical service provider and other medical service providers in the local geographical area, the regional geographical area (i.e., the same region of a 5 to 100 miles or so in radius or the same county), the state geographical area, and/or a national geographical area.

The repricing/cost containment entity RCCE 22 conducts and completes its analysis of the medical service provider's bill and issues a recommendation in step 37 back to the TPA 16. The RCCE's recommendation may be provided in electronic or hard copy form and may be referred to as an Explanation of Review (EOR). An EOR explains the reasons for any line item repricing of a medical service or medical product provided by the medical service provider 20; the Explanation of Review may also contain ERISA claim denial language supporting a decreased and repriced line item amount owed. A repriced line item may be repriced at a reasonable value for the medical services or products. The ERISA claims denial language is necessary because the recommendation by the RCCE 22 of the medical service provider's claim is a value lower than the original medical service provider's claim, which under ERISA constitutes an adverse benefit determination. As an assignee of the participant's benefits under the EMBP, the provider is entitled to notice of an adverse benefit determination.

The TPA 16 receives, electronically or in hard copy, the repricing recommendation from the RCCE 22 and fully understands that, in some embodiments of the present invention, the repricing recommendation is exactly that . . . a recommendation. The RCCE 22 may have no payment obligation to the medical service provider and may make no guarantee of payment or have any control over whether the TPA 16 follows its recommendation for repricing or not.

Assuming the TPA 16 decides to follow the RCCE's 22 recommendation for repricing the medical service provider's claim to a decreased, reasonable value amount, the TPA 16, under its administrative authority, will request funding for the repriced decreased medical service provider claim from the employer 12 or from a fund funded by the employer under the Reasonable Value Plan 14 in step 38. The funds used to pay the repriced medical service provider's claim would come out of the employer's set-aside funds for its self-insured medical benefit plan in accordance with language found in the EMBP 14.

At step 40, the employer 12 or the fund established by the employer funds the claim and transmits the funding of the claim to the third party administrator 16. The funding of the claim is usually done electronically, but may be performed using other known methodologies. The TPA 16 receives the funds for the claim and further reviews the Explanation of Review (EOR), which is provided in step 42A from the RCCE 22. The EOR as stated before, provides an explanation for the decreased payment or the denial of full payment for the medical services provided by the medical service provider 20. The RCCE may also provide an Explanation of Benefits (EOB) that is used to verify that the TPA 16 has accepted the repricing recommendation of the repricing/cost containment entity 22. Since the EOR is subjecting the medical service provider to an adverse benefit determination, the EOR provides and includes ERISA denial notices in accordance with one or more provisions of ERISA.

It should be understood that step 42A, wherein the RCCE is providing an EOR to the TPA 16, could occur anywhere between and during steps 38 through 40. In some circumstances, the provision of the EOR from the repricing/cost containment entity may even occur after step 40. Regardless, in most circumstances the EOR is generally received by the TPA 16 prior to the medical service provider's claim being funded for payment.

At step 42B the TPA 16 forwards the EOR to the medical service provider 20 to explain to the medical service provider 20 the supporting reasons for the medical service provider's decreased receipt of the funds it is receiving from the EMBP 14. At or about this time the TPA 16 also transmits or provides the dollar amounts for the repriced claim to the medical service provider.

At the next step, step 44, since the EMBP 14 pays 100 percent of the participant's benefit to the medical service provider for the patient employee/participant 18, the patient then pays the TPA 16 the percentage amount that the patient is responsible for paying under the reasonable value plan 14. The patient provided payment is placed into the EMBP fund for later use by the exemplary EMBP 14. It is important to understand that the patient employee/participant 18 is not paying the medical service provider 20 for the medical services, which is what has been done previously in existing PPO and other medical benefit plans and other medical service plans. The patient employee is paying the EMBP. The payment from the patient employee/participant to the EMBP can be accomplished through one of several available funding mechanisms, including but not limited to: cash transfers, authorized payroll deductions, installment payments, payment from a medical reimbursement account or payment from an authorized credit or debit card.

Explained in another way, instead of paying the medical service provider directly, the patient employee/participant 18 pays the TPA 16 that portion of the claim that the patient is responsible for under the EMBP 14. In exchange for the patient's payment to the EMBP, the EMBP 14 provides the 100 percent benefit language in its plan. The EMBP agrees to further defend the patient against any medical service provider claims with respect to the medical service provider being owed an amount over and above the amount which the EMBP has paid the medical service provider 20. Furthermore, the EMBP indemnifies the patient 18 in the event that there is a judicial determination of the medical service provider being owed an additional amount that is more than what the TPA had previously paid to the medical service provider.

At step 46, after the TPA has funded the reasonable repriced amount of funds to the medical service provider, there may be an interaction between the RCCE 22 and the medical service provider 20. In these circumstances the repricing entity 22 is acting and on behalf of the TPA 16, the EMBP 14 and the patient employee 18. The RCCE 22 negotiates with the medical service provider to establish that the medical service provider is satisfied with the reasonable repriced payment made by the TPA for the services rendered to the patient. If for some reason the medical service provider 20 is not satisfied with the repriced reasonable value paid for the services provided, the repricing/cost containment entity 22 works with the medical service provider toward a determination of a possible additional amount that the medical service provider would accept to completely settle the claim. Step 46 is generally used in an exemplary method when or if the medical service provider is not content or does not agree that the repriced amount received for the medical services provided to the patient 18 is a fair and reasonable amount or value for the services or products rendered or provided to the patient.

If the repricing/cost containment entity 22 is not able to negotiate a settlement with the medical service provider 20, embodiments of the present EMBP are designed to be governed under ERISA and require that any service provider's collection activity must proceed through the ERISA appeals process. Although not shown specifically in FIG. 1 and still at step 46 the repricing/cost containment entity 22 may manage the ERISA appeals denial process on behalf of the TPA and the EMBP. In various embodiments of the invention, the repricing entity may also manage a litigation on behalf of the patient 18, the TPA 16, and the EMBP 14 if the ERISA appeals denial process does not resolve the matter with the service provider to any of these three party's satisfaction. In various embodiments the TPA and the RCCE are the same entity.

If the negotiation of the repricing between the RCCE 22 and the medical service provider 20 results in the RCCE 22 agreeing that the medical service provider should have been paid additional moneys for the medical services or products provided to the employee, then the EMBP may fund the additional moneys and provide them to the medical service provider 20. Furthermore, if the medical service provider 20 were to prevail in the ERISA action, the funds to pay any judgment would also come from the EMBP's allotted funds. It is further understood that the patient employee/participant is not part of these negotiations and is protected from any collection activity from the medical service provider because embodiments of the present invention are designed to protect the patient from further financial responsibility beyond the amount that the patient pays to the third party administrator in step 9.

In other embodiments of the present invention a EMBP 14 or a Reasonable Value Plan is established for a self-insured employer such that the plan may be governed by ERISA. When an exemplary EMBP is set up, the language within the EMBP clarifies that payments and covered benefits are for (i) reasonable charges defined as the market value price being paid by commercial payers for the same or similar medical bills; (ii) covered services that Medicare had established are medically effective and should be paid for and/or are otherwise limited by the EMBP's defined benefits; and (iii) valid charges are defined by rules used by Medicare (i.e., no unbundling of goods or services, etc.) and perhaps by other industry-standard editing systems that filter-out abusive charging by medical service providers. At present some examples of industry-standard editing systems that filter-out abusive charging that are being used in the industry are provided by firms such as McKesson, Ingenix, and Solucient.

Furthermore, an exemplary EMBP would have an administrator or TPA who sets up trust accounts to receive patient coinsurance and perhaps co-payment amounts from the patient participants. This is done because an exemplary EMBP pays 100 percent of the plan covered medical benefits. The trust account or accounts may collect or account for the employee/participant/beneficiaries' deductible payments owed and may credit the employee/participant/beneficiaries' co-pay portion that may have been paid to the medical service provider. In some embodiments of the invention, the administrator or TPA may receive cash transfers or installment payments or acquire authorization to withdraw moneys from the EMBP participant's medical reimbursement account or to be able to charge the participant's/employee's debit or credit card account electronically or directly. By allowing the TPA this authorization, collections by the TPA from an employee/participant may be more streamlined and convenient for all parties.

Furthermore, when setting up an exemplary EMBP, new medical benefit cards may be provided to each of the employees and participants. The medical service providers would also be directed to send any medical bills or claims to a medical billing clearing house. A medical billing clearing house is a public or private entity that does either of the following: A medical billing clearing house may process or facilitate the processing of information received from another entity in a nonstandard format (or containing nonstandard data content) into standard data elements or a standard transaction. A medical billing clearing house may also receive a standard transaction from another entity and process or facilitate the processing of information into a nonstandard data format or nonstandard content for yet another receiving entity. A medical billing clearing house may be an entity that provides various services including, but not limited to, billing services, reviewing and analyzing bills, community health management information systems or community health information systems, and/or value-added networks and switches that may be considered healthcare clearing houses if they also perform the previously named functions.

The medical benefit cards that are provided to the employees and participants under an exemplary EMBP would provide the phone number and other contact information for medical service provider inquiries into what medical services they may be paid for and what is required for preauthorization of the medical services.

In various embodiments of the present EMBP and method for providing the same, when a medical service bill is processed by a repricing/cost containment entity (RCCE), the repricing/cost continuing entity will provide the administrator or TPA an electronic feed (EDI), which comprises a scrubbed and repriced bill in accordance with the EMBP language and requirements. The provided electronic feed EDI is in a form or format that is ready for automatic or manual adjudication with the medical service provider. Furthermore, in other variations of the exemplary invention, the repricing/cost containment entity may provide the TPA additional services, including the screening out of medical service provider claims that are for ineligible participants in the EMBP; flagging, for the TPA's review, possible duplicate bills or partial-duplicate charges from or on previously submitted bills from the same medical service provider for the same employee/participant; or flagging, for the TPA, possible fraudulent claims using fraud detection software.

Furthermore, in embodiments of the invention, the RCCE may provide a variety of information to the TPA in the form of an EOR or an EOB. In doing so, an exemplary EMBP or the TPA acting as a representative or administrator of the EMBP will be placed in a better adjudication position that supports a denial or partial denial of a medical service provider's claims for medical services and products provided to an employee or participant. The EMBP or TPA may also be placed in an better position, with the services of the RCCE, to determine the actual eligibility of the patient employee or participant, review possible duplicate or duplication of charges, review charges that are flagged as being potentially fraudulent, review the particular services or products that have been repriced by the repricing/cost containment entity and are covered under the EMBP, calculate a patient's payment amount owed to the EMBP, approve a payment amount for payment to a medical service provider, submit an invoice for a claimed or repriced reasonable value claim to the EMBP, transfer payment from an EMBP to the medical service provider, and approve the release of payment checks to medical service providers.

After a claim is processed and reviewed by a RCCE and results from the RCCE's review is provided and reviewed by the administrator or TPA (claim processing post-adjudication), the TPA may utilize the RCCE or affiliates thereof by sending approved claim and payment information to the RCCE for the printing or creation of electronic files containing detailed language including explanations of review (EOR) and ERISA denial language that may be sent or provided to the medical service provider in a single organized electronic package for a physical file. The TPA may further utilize the RCCE for posting information related to the medical service provider's medical service bill or claim (as well as the repricing therefore) on a website, with proper security access codes, that can be easily reviewed and that provides the reasons that the medical service provider's charges for services or products were reduced along with access to an authoritative source or sources (e.g., databases, EMBP language, statutes, ERISA documentation) supporting each reduction. The provided website may also allow the medical service provider to have interactive access with the RCCE for the purpose of requesting additional information or clarification about the reasonable value of one or more of the repriced medical service bill line items.

In some embodiments of the invention the RCCE entity may act totally or in part as the TPA. That is the repricing/cost containment entity may administer the EMBP for the employer by handling all the billing and payment statements that are due to the EMBP from the patient and/or due from the EMBP to the medical service provider as well as some or all of the other administrative functions performed by a TPA.

Furthermore, in other embodiments, the EMBP or TPA may be permit or be permitted to add an amount that is adjustable, fixed, predetermined, or defined by the EMBP, to the recommended repriced claim prior to requesting payment to the medical service provider in order to help eliminate or to settle further negotiations with the service provider. The added amount may be an amount from 1% to 60% of (the amount billed by the medical service provider minus the recommended repriced claim amount). The added amount may be reflective of the specific Reasonable Value payment standards set forth in the EMBP plan documents and may be used to further aid acceptance of the reduced repriced amount by the medical service provider as full payment for the medical services provided to the employee participant.

Refer now to FIGS. 2A through 2E, a flowchart of an embodiment of an exemplary EMBP or Reasonable Value Plan and method or business method for providing such an EMBP is provided. At step 100 an employee participant goes to a medical service provider in hope of receiving medical services or products. The employee participant provides the physician or medical service provider facility his or her exemplary EMBP details or medical plan card so that the medical service provider can verify the employee's benefit eligibility. If the employee participant is in fact eligible for medical services, the medical service provider may request a co-pay amount to be paid prior to providing or performing medical services or products to the employee patient. The co-pay is paid by the patient employee participant to the medical service provider. The medical service provider may then perform the necessary medical services or provide the needed medical products to the patient.

After the medical services have been provided, at step 102, medical billing documentation is created by the medical service provider. The medical billing documentation documents the medical services performed on the patient and the medical products provided to the patient by the medical service provider. This documentation may be created and generated electronically and forwarded to a medical billing clearing house or to the TPA. In an alternative the medical billing documentation may be provided in the form of a paper copy or hardcopy that is submitted via mail or courier to the TPA, the exemplary EMBP, or to the employee participant.

At step 104, a medical billing clearinghouse receives the paper copy of the bill that was provided to the TPA, the EMBP, or the employee participant and converts it into an electronic file. Conversely, the medical billing clearing house may receive the electronic file provided from the medical service provider. Upon completion of creating an electronic file in an accepted standard format from the medical service provider's bill (paper or electronic file) the medical billing clearinghouse forwards the standardized electronic file to the TPA of the exemplary EMBP.

At step 106, the TPA receives the electronic version of the medical service bill from the clearinghouse for the medical services provided to the patient employee/participant. Upon receipt of the electronic billing file or receipt of a paper copy of the medical billing, the TPA performs eligibility checking and duplicate checking to make sure that the patient is eligible for benefits and that the bill is not a duplicate or partial duplicate of a previously received bill. When the TPA completes the eligibility and duplication checking, a second electronic billing file may be created and forwarded to a RCCE. In some embodiments, a paper copy of the medical bill that has been checked for eligibility and duplication may then be submitted to a medical billing clearinghouse for conversion into an electronic billing file that then is forwarded to the RCCE.

At step 108, and in some embodiments of the invention, a paper copy of the medical bill is converted into an electronic billing file and forwarded to the RCCE.

At step 110, the RCCE receives the electronic or hard copy of the medical billing from the TPA or from the medical billing clearinghouse, or an imaged copy may be received by the RCCE from the TPA, EMBP, or billing clearing house from steps 104, 106, and 108 above. The RCCE then proceeds to scrub the medical service provider's billing. A scrubbing or claim scrubbing process verifies the technical and coding accuracy of the claims by identifying potential problems that will cause claim rejection or a reduction in payment for the claims. A claim, of course, is a request for payment for medical services or products and benefits that a claimant (patient employee/participant in an exemplary EMBP) has received. The scrubbing process provides a comprehensive set of coding and technical edits thereby standardizing and clarifying each medical service provider's claim or bill. Each individual edit, in a method of the present invention, may be enabled or disabled completely depending on, for example, the specific claim type, the claimant, or the payor of the claim.

At step 114, the medical service provider's scrubbed bill is further reviewed by the RCCE. The RCCE may perform N/LMRP (NCD/LCD) edit checking on the physician and facilities medical billings. N/LMRP (National and Local Medical Review Policy) is an administrative and educational tool that assists medical service providers, physicians, and suppliers in submitting correct claims for payment. Local policies outline how contractors are to review claims to ensure that they meet Medicare coverage requirements. CMS (Centers for Medicare/Medicaid Services) requires that an N/LMRP be consistent with national guidance (although an N/LMRP may be more detailed or specific), be developed with scientific evidence and clinical practice, and be developed through predetermined specified federal guidelines. NCDs (National Coverage Determinations) set forth the extent to which Medicare will cover specific services, procedures, or technologies on a national basis. Medicare contractors are required to follow NCDs. If an NCD does not specifically exclude or limit an indication or circumstance, or if an item or service is not mentioned at all in an NCD or in a Medicare manual, it is up to the Medicare contractor to make the coverage decision (i.e., using an LMRP). Prior to an NCD taking effect, CMS must first issue a manual transmittal, seamless ruling, or federal registered notice giving specific directions for proper claims processing. The issuance of the specific directions, which includes an effective date and an implementation date is the NCD. NCDs are published in the Medicare National Coverage Determinations Manual. An LCD (Local Coverage Determination), as established by section 522 of the Capital Benefits, Capital Improvement, and Capital Protection Capital Act, is a decision by a fiscal intermediary or carrier of whether to cover a particular service on an intermediary-wide or carrier-wide basis in accordance with section 1862 (a) (1) (A) of the Social Security Act (i.e., a determination as to whether the services are reasonable and necessary). The difference between LMRPs and LCDs is that LCDs consist only of "reasonable and necessary information," while LMRPs may also contain category or statutory provisions.

At step 116, the RCCE performs fraud checking on the physician as well as the medical service provider facility with respect to a database containing their history of fraudulent billings. The historic information provides an early warning or flag with respect to a potential for fraudulent or improper billing practices from the particular medical service provider.

Referring to FIG. 2C and step 118, the RCCE performs an adjudication of the physician/medical facility's or service provider's billings. The adjudication process results in the potential repricing of the medical service provider's bill. The adjudication may include reviewing and comparing databases containing the medical service provider's cost-to-charge ratio histories, cost-to-profit margin histories, and making a comparison with preexisting medical service costs for the same line items and/or medical services provided by medical service providers in a defined geographical area. The defined geographical area may be a local community area, the surrounding county, an economically comparative geographical region, the state that the medical service provider is located in, or with respect to a national average for the same or similar medical services or products being provided. The RCCE may determine that one or more of the medical services or products (line items) are overpriced because it exceeds an amount that is greater than an acceptable price as determined from a comparison of the database content and the medical service provider's medical service bill. As such, the RCCE may reprice the medical service bill line item to a repriced amount, which is less than the billed amount for the particular medical service or product from the medical service provider.

The repriced line item and bill are repriced to a reasonable value for the services or products provided based on the comparison and mathematical analysis with one or more of the preexisting databases. When the RCCE completes review and repricing of the medical service provider's bill, the RCCE creates a repriced electronic medical billing file or a paper copy of the repriced medical service or product bill evaluation and forwards it to the administrator of the exemplary EMBP or the TPA for review.

At step 120, the TPA receives the electronic or paper copy of the repriced medical billing file from the RCCE and reviews the adjudication results. The TPA uses the adjudication results and repricing information to make decisions as to whether to accept the suggested repricing from the RCCE. The TPA reviews the charges flagged by the RCCE for possible fraud. The TPA also reviews the patient's medical billing file and verifies that the adjudicated services are services or products covered by the patient's exemplary EMBP. The TPA may also at this time apply the appropriate deductible calculations to the various line items of the repriced bill. The deductibles may be different for different services and products depending on the language and requirements of the EMBP that the TPA is administrating.

At step 122, the TPA calculates the appropriate payment amounts that the participant employee needs to pay the EMBP. The TPA further calculates the payment amount that the EMBP will owe for the services or products provided by the medical service provider. The TPA may create an additional electronic medical billing file and/or payment file for check printing or may edit the previous file.

The TPA reviews the payment to the medical service provider for the claim or bill regardless of whether the bill has been repriced or not, prior to distribution. The TPA must perform these tasks in a way that conforms with ERISA. The repriced bill must be approved for payment by the TPA or EMBP within a predetermined number of days after receiving the repricing recommendation from the RCCE so that the repricing will not become outdated or stale and so that the RCCE will stand by, support, or in some embodiments, indemnify the EMBP and/or the patient with respect to the repricing and explanation of the repricing provided to the TPA. In the steps shown the payment requirement is within 21 days, but the requirement could be as little as 10 or as many as 120 days. At step 124 the TPA requests funding for the payment so that the medical service provider claim will be paid in accordance with the repriced billing amount. Here if the payment file is electronic, we move to step 126. Conversely if this payment step is not electronic, the path in this method moves to step 127.

At step 126, the TPA forwards the final and approved-for-payment electronic medical billing file or paper copy of the repriced medical billing along with an approved payment file for check printing to the RCCE. Referring now to FIG. 2D in step 128, the RCCE receives the final (approved for payment) electronic billing file from the TPA or paper copies thereof. The RCCE applies the appropriate adjudication reasons and codes along with proper ERISA denial language to the file. The adjudication codes and ERISA denial language supports the decrease and repricing of the original medical service provider's bill and supports the reasonable value of the payment for the medical services of products.

At steps 130 and 132, the RCCE creates an Explanation of Benefits (EOB) print file or PDF file verifying that the TPA accepts the repricing recommendation. The RCCE forwards the EOB print file to the TPA for the TPA to either print or place in its electronic file storage. Of course, the TPA will review the EOB and forward it as explained below.

At step 134, the RCCE may populate and/or provide a secure website with the EOB print results for viewing by the TPA and the particular medical service provider. The website will provide the medical service provider with a view of the EOB and/or EOR results and the mathematical and factual reasons for the reduction of charges, along with access to any authoritative sources that support each reduction of charges where applicable. The authoritative sources may support one or more of the reduced payments for line items from the medical service provider's original claim or billing for services or products provided to the employee/participant of the exemplary EMBP.

Referring back to FIG. 2C and step 124, the TPA may have decided to provide the funding notification to a check printing service or vendor. In step 127, a funding notification and the medical billing payment file for the specified medical service provider is forwarded to a check printing service, where the checks may be printed by the TPA's organization. The check printing service may be a bill paying service or other service that has been given the responsibility of making payments as instructed by the TPA. At step 129, the checks and the final medical billing payment are forwarded to the appropriate TPA department. Further explanation of the method continues at FIG. 2E, wherein steps 134 and 129 converge again at step 136. Here the TPA receives the EOB print file from the RCCE or the printed checks from within the TPA's organization or from a check printing vendor. At step 138, the TPA will print the EOB print file and/or electronically provide the EOB to the exemplary Reasonable Value Plan or SINBP, the employee/participant, and the medical service provider. Steps 140 and 142 provide for the TPA to collate archiving copies or originals of specified documents and for mailing or providing the EOBs to the different entities as well as the check or electronic transfer/wire payment of the repriced amount to the medical service provider.

Step 144 indicates that the EOB may act as an invoice requesting payment from the employee/participant of the exemplary EMBP. At step 148, the TPA collects payments from the employee/participant of the exemplary reasonable value plan. It is noted here that the employee participant pays the EMBP via the TPA for the employee portion or percentage owed of the medical services provided by the medical service provider. The employee does not pay the medical service provider in exemplary embodiments of the invention.

At this time, the medical service provider receives payment of the repriced amount for the medical services or products provided to the participant employee of the exemplary EMBP. At this time, the medical service provider may accept the repriced payment as a reasonable value and full payment for the medical services provided. If the medical service provider does not accept the repriced amount as a reasonable value for the medical services or products provided to the employee, the medical service provider must use procedures provided under the ERISA appeals process to resolve their dissatisfaction of the repriced payment for any one or more line items in the repriced bill.

In various embodiments, the RCCE will aid the TPA and the exemplary EMBP in defending against a medical service provider who requests payment above the repriced amount. The RCCE may further buttress the reasons for the repricing and recalculation of the medical service provider's bill, such that the reasonable value of the services provided by the medical service provider are further substantiated with statistical fact and preexisting data supporting the repriced and reasonable value of medical services of the same type, caliber, and in the same or similar geographic location.

The employee/participant of the exemplary EMBP is indemnified and protected under ERISA via the exemplary EMBP such that a medical service provider cannot collect additional payments from the employee participant of the EMBP.

Embodiments of the present invention provide a new type of self-insured medical benefit plan that may be provided by a small business or self-insured business for the benefit of its employees and their families. Exemplary EMBPs protect participants in the medical benefit plan from attempts by a medical service provider to circumvent the billing process and harass the employee/patient/participant to seek or attempt to collect additional payment from the employee/participant. Furthermore, the medical service provider is entitled to collect a reasonable value for the services or products provided to the employee participant. The reasonable value may be defined under the exemplary EMBP as a value that is in accordance with Medicare and Medicaid rules and provisions, but also an amount that falls within the normal or average, or within a defined % above the normal or average amount paid to other medical service providers for the same or similar services within the same or economically similar community, county, geographical district, type of medical facility, type of physician, geographical location, state or otherwise.

It will be appreciated by those skilled in the art having the benefit of this disclosure that this invention provides a new self-insured medical business plan that protects employees under ERISA and allows medical service providers to be paid a reasonable value for the medical services and products that they provide to the participant employees of the self-insured medical benefit plan. A PPO is not used or does not have to be used in embodiments of the exemplary EMBP, but it is envisioned that in some embodiments a PPO or an entity somewhat similar to a PPO may still interact between the medical service providers and a TPA who is responsible for an exemplary EMBP. A RCCE would review, analyze and reprice medical bills for either the PPO or the TPA in order to rein in unreasonable claims.

Furthermore, embodiments of the present invention provide a method of providing the exemplary self-insured medical benefit plan that is funded by an employer and administered by an administrator or third party administrator to the benefit of the employer's participating employee's and in various embodiments the employee's family members. The participants are protected and indemnified against a medical service provider's attempts to collect additional payment or moneys. This indemnification and protection is provided under ERISA, but has not been incorporated in any previous self-insured medical business plans to the benefit of employees. There has been a long-felt need that employees should be protected against the harassment of medical service providers when the employees are participating in an employer-provided medical benefit plan. Furthermore, there has been an additional long-felt need that the rising costs of medical service providers' services and products have increased at alarming rates, even with the presumed protection and discounts provided by PPO networks. Such rate increases should be limited to their reasonable value as defined by an agreement, directly or indirectly, between medical service providers and ERISA medical benefit plans.

It should be understood that the drawings and detailed description herein are to be regarded in an illustrative rather than a restrictive manner, and are not intended to limit the invention to the particular forms and examples disclosed. On the contrary, the invention includes any further modifications, changes, variations, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. For an ERISA Medical Benefit Plan (EMBP) established by an employer for the benefit of an employee of said employer, said EMBP comprising funds for a payment of medical services provided by a medical service provider to said employee, a method of repricing a medical service provider bill, by a third party, for medical services provided to said employee, said method of repricing said medical service provider bill comprising:

receiving and storing, by the third party, said medical service provider bill data in a computer system, said medical service provider bill data comprising a description of a medical service, a code for said medical service, and a charge for said medical service;

checking, by the computer system, said medical service provider bill data for a medical service code error;

comparing, by the computer system, said medical service provider bill data with a calculated cost-to-charge ratio history or a calculated profit margin history for said medical service provided by the medical service provider;

determining, by the computer system, if the charge for the medical service comprises a cost-to-charge ratio or profit margin that is greater than the calculated cost-to-charge ratio history or the calculated profit margin history by a predetermined maximum amount;

comparing, by the computer system, said medical service provider bill data with medical service cost database data and determining if said charge for said medical service is within a predetermined range of acceptable charges for a same description of said medical service or a same code for said medical service within a same or similar geographically comparable area;

providing to the EMBP, by the computer system, a recommended repriced charge for said medical service being in accordance with an agreed upon definition of reasonable value for the medical service, the recommended repriced charge being based on a mathematical comparison and analysis of the calculated cost-to-charge ratio history, the profit margin history, or the medical service cost database data for the same description of the medical service or the same code for the medical service within the same or similar geographically comparable area, the recommended repriced charge comprising a lower recommended amount for the EMBP to pay said medical service provider for said medical service, an explanation of review document, and appropriate ERISA claim denial or partial denial language adapted to indemnify the employee under ERISA from the medical service provider collecting payments above the recommended repriced charge from the employee; and negotiating electronically, by the third party, to get the medical service provider to accept the recommended repriced charge as being in accordance with the agreed upon definition of reasonable value for the medical service.

2. For an Employee Retirement Income Security Act (ERISA) governed Medical Benefit Plan (EMBP) established by an employer for the benefit of an employee of the employer, the EMBP comprising funds for a payment of medical services provided by a medical service provider to said employee, a method of repricing a medical service provider bill, by a third party, for medical services provided to the employee, the method of repricing the medical service provider bill comprising:

receiving and storing, by the third party, the medical bill provider bill data in a computer system, the medical service provider bill data comprising a description of the medical service, a code for the medical service, and a charge for the medical service;

checking, by the computer system, the medical service provider bill data for a medical service code error;

providing to the EMBP, by the computer system, a recommended repriced charge for the medical service being in accordance with an agreed upon definition of reasonable value for the medical service, the recommended repriced charge being based on a mathematical comparison and analysis of calculated cost-to-charge ratio history data, calculated profit margin history data, or medical service cost data base data for substantially the same description of medical service or the same code for the medical service within the same or a similar geographically comparable area, the recommended repriced charge comprising a lower recommended amount for the EMBP to pay the medical service provider for the medical service, an explanation of review document and appropriate ERISA claim denial or partial denial language adapted to indemnify the employee against the medical service provider collecting payments from the employee that exceed the recommended repriced charge; and negotiating electronically, by the third party, for the medical service provider to accept the recommended repriced charge as being in accordance with the agreed upon definition of reasonable value for the medical service.

* * * * *